(12) United States Patent  (10) Patent No.: US 7,279,640 B2
White et al.  (45) Date of Patent: Oct. 9, 2007

(54) WIRING HARNESS

(75) Inventors: Steven R. White, Lindstrom, MN (US); Richard W. White, Birchwood, MN (US)

(73) Assignee: Novel Concepts, Inc., Birchwood, MN (US)

( * ) Notice: Subject to any disclaimer, the term of this patent is extended or adjusted under 35 U.S.C. 154(b) by 5 days.

(21) Appl. No.: 10/908,424

(22) Filed: May 11, 2005

(65) Prior Publication Data

US 2006/0254806 A1 Nov. 16, 2006

(51) Int. Cl.
*H02G 3/08* (2006.01)
(52) U.S. Cl. ................. 174/135; 174/48; 174/68.1; 439/483; 315/82
(58) Field of Classification Search ........... 174/48–50, 174/68.1, 69, 70 C, 71 R, 72 A, 135, 494, 174/495; 307/10.1; 315/82; 439/35, 483, 439/50
See application file for complete search history.

(56) References Cited

U.S. PATENT DOCUMENTS

| 4,280,062 | A | * | 7/1981 | Miller et al. ............. 174/72 A |
| 4,354,726 | A | * | 10/1982 | Kato et al. .................. 439/763 |
| 4,647,139 | A | | 3/1987 | Yang |
| 4,842,524 | A | * | 6/1989 | Hopkins et al. .............. 439/35 |
| 5,184,960 | A | | 2/1993 | Hopkins et al. |
| 5,583,414 | A | * | 12/1996 | Lawrence ................... 320/107 |
| 5,599,210 | A | | 2/1997 | Green |
| 5,703,411 | A | | 12/1997 | Bella et al. |
| 5,841,203 | A | * | 11/1998 | Chambers et al. ......... 307/10.8 |
| 5,869,907 | A | | 2/1999 | Marier |
| 5,912,511 | A | | 6/1999 | Hidaka |
| 5,963,013 | A | * | 10/1999 | Watson et al. ............. 307/10.1 |
| 6,005,300 | A | | 12/1999 | Kelly |
| 6,007,373 | A | * | 12/1999 | Chew .......................... 439/500 |
| 6,036,533 | A | * | 3/2000 | Huang ........................ 439/623 |
| 6,121,551 | A | | 9/2000 | Dobrow |
| 6,222,443 | B1 | | 4/2001 | Beeson et al. |
| 6,291,770 | B1 | * | 9/2001 | Casperson ................. 174/72 A |
| 6,469,404 | B1 | * | 10/2002 | Pohjola ..................... 307/10.1 |
| 6,486,407 | B1 | * | 11/2002 | Hawker et al. ........... 174/72 R |
| 6,504,306 | B2 | | 1/2003 | Menze |
| 6,528,899 | B1 | * | 3/2003 | Saito et al. ................ 307/10.1 |
| 6,626,477 | B2 | | 9/2003 | Maynard et al. |
| 6,674,182 | B2 | | 1/2004 | Maynard et al. |
| 6,695,621 | B1 | * | 2/2004 | Wang ........................... 439/35 |
| 6,746,274 | B1 | * | 6/2004 | Verfuerth .................. 174/72 A |

FOREIGN PATENT DOCUMENTS

WO  WO 03/058763  7/2003

* cited by examiner

*Primary Examiner*—Dhiru R. Patel
(74) *Attorney, Agent, or Firm*—Larkin Hoffman Daly & Lindgren Ltd.; Thomas J. Oppold

(57) ABSTRACT

A wiring harness kit that includes a main extension portion and a utility extension portion. The main extension portion is electrically coupled at its first end to the host vehicle's electrical system. The utility extension portion electrically connects at one end to the second end of the main extension portion and is adapted to electrically couple at its other end to an electric load. The utility extension portion may include first and second segments, wherein the second segment includes a plurality of interchangeable adaptor sections each having a different connector for electrically coupling with the electric load.

4 Claims, 11 Drawing Sheets

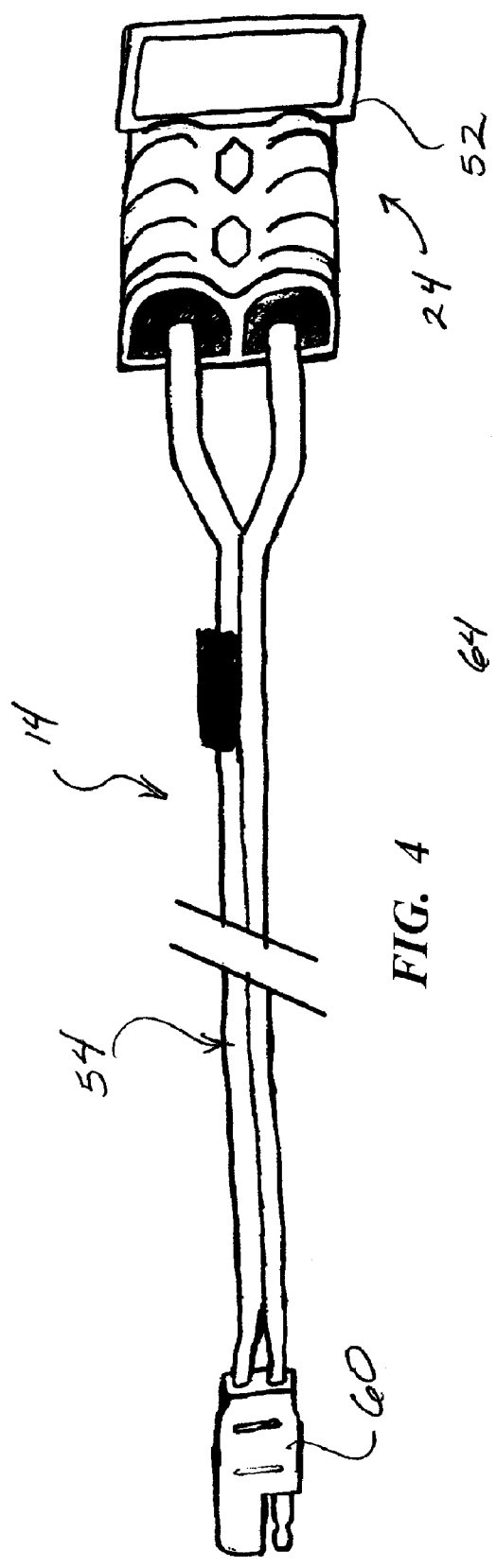
FIG. 4
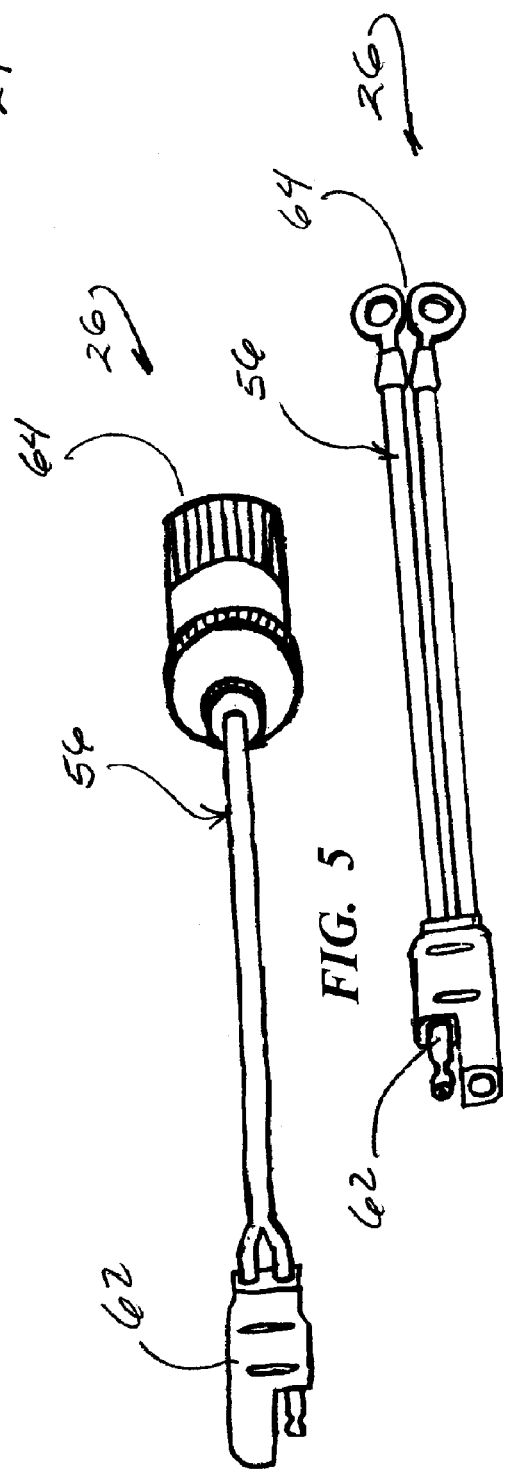
FIG. 5
FIG. 6

WIRING HARNESS

BACKGROUND

Trailer light connection systems adapted to electrically couple the brake lights and back-up lights of a towing vehicle to that of the towed vehicle are well known in the art. An example of one such trailer light connection system is disclosed in U.S. Pat. No. 5,184,960. Accessory power cords adapted to plug into a vehicle's lighter for powering electrical appliances, such as spot lights, warning lights, air pumps, coffee pots, small refrigerators or coolers, etc., are also well known. An example of one such accessory power cord is disclosed in U.S. Pat. No. 4,647,139. It is also well known to provide jumper cables for jump starting a vehicle or for charging the battery of a vehicle.

While each of the separate systems or devices identified above may serve its intended purpose, a need remains for a wiring harness that combines the features and functionalities of a trailer light connection system, accessory power cords and jumper cables.

SUMMARY

A wiring harness kit that includes a main extension portion and a utility extension portion. The main extension portion is electrically coupled at its first end to the host vehicle's electrical system. The utility extension portion electrically connects at one end to the second end of the main extension portion and is adapted to electrically couple at its other end to an electric load. The utility extension portion may comprise first and second segments, wherein the second segment comprises a plurality of interchangeable adaptor sections each having a different connector for electrically coupling with the electric load.

DESCRIPTION OF THE DRAWINGS

FIGS. 4-7 are general illustrations of various embodiments of other types of utility extension portions of the wiring harness kit of FIG. 1.

DETAILED DESCRIPTION OF THE INVENTION

Figure 1:
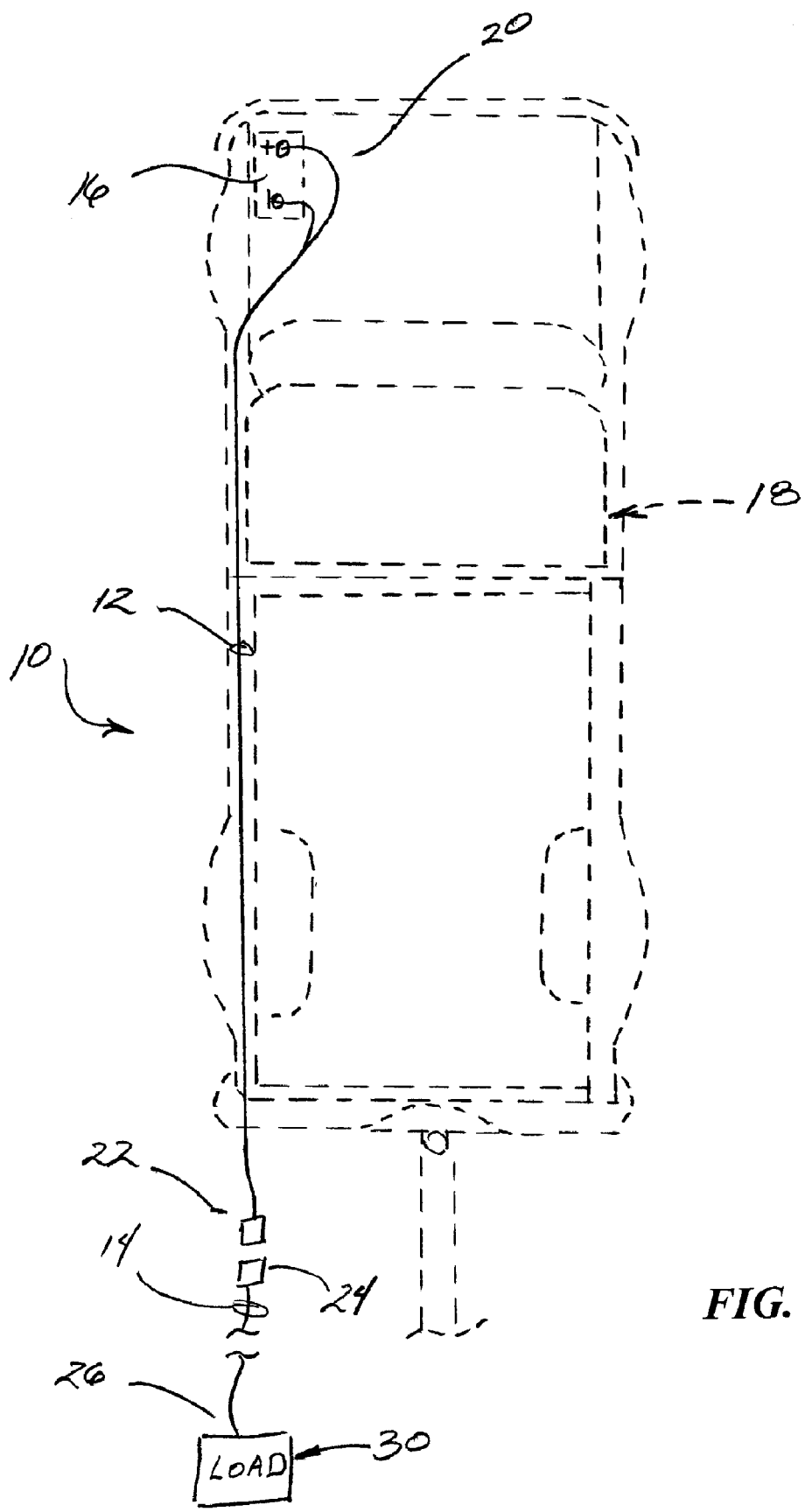
FIG. 1 is a plan view of a vehicle illustrating one embodiment of the main extension portion of the wiring harness kit of the present invention connected at its first end to the electrical system of a host vehicle, the second end disposed remote from the first end and adapted to matingly connect to the utility extension portion.

Referring to the drawings wherein like reference numerals designate identical or corresponding parts or features throughout the several drawing figures, FIG. 1 illustrates an embodiment of the wiring harness 10 of the present invention. The wiring harness 10 includes a main extension portion 12 and a utility extension portion 14. The main extension portion 12 connects to the electrical system 16 (such as to the terminals of a battery) of a host vehicle 18 at a first end 20 thereof. A second end 22 of the main extension portion 12 connects to one end 24 of the utility extension portion 14. The other end 26 of the utility extension portion 14 is adapted to connect to an electric load 30. The electric load 30 may be any type of electric load, including, for example, another battery, an electrical appliance, or any other accessory that requires or draws electric current.

Figure 2:
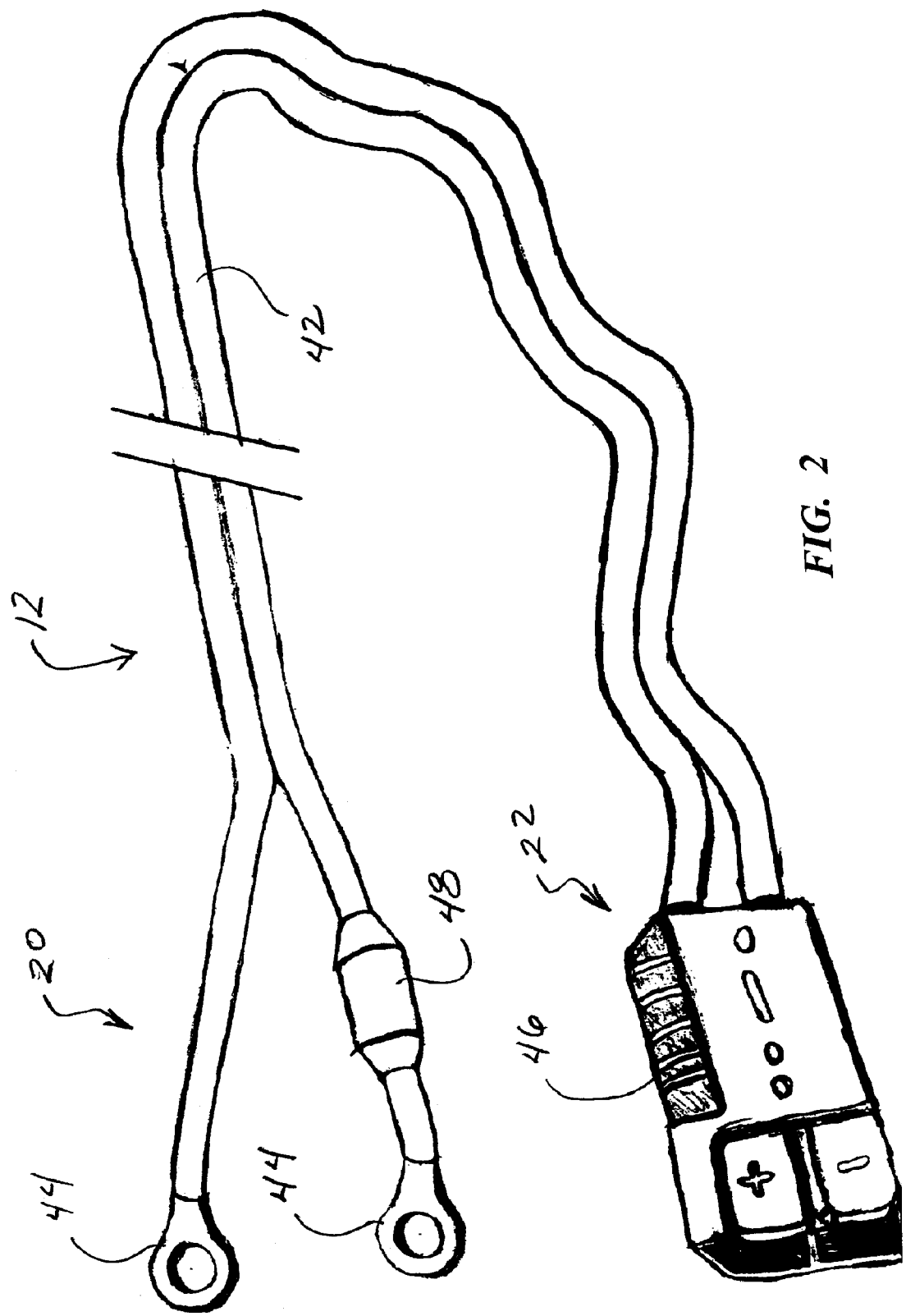
FIG. 2 is a general illustration of a preferred embodiment of the main extension portion of the wiring harness kit of FIG. 1.

Referring to FIG. 2 in combination with FIG. 1, the main extension portion 12 includes a two-pair insulated electrical conductor 42, preferably six or eight gauge (6 awg or 8 awg), of sufficient length to extend from the host vehicle's battery 16 or other power source to a desired location, such as to the side or to the rear of the host vehicle 18 where the electrical load 30 is expected to be located. The first end 20 of the main extension portion 12 preferably includes connectors 44 for connecting to the host vehicle's battery 16. The connectors 44 may be any suitable type of connectors, but in the preferred embodiment, the connectors 44 are preferably spade terminals, including ring-type, fork type or the like, for semi-permanently connecting to the battery terminals, so that, once installed, the connectors 44 will not become unintentionally disconnected until it is desired to remove the wiring harness 10 from the host vehicle 18.

The second end 22 of the main extension 12 preferably includes a female receptacle 46 to receive one end 24 of the utility extension portion 14. The female receptacle 46 is preferably a 175 amp two-pole connector that is keyed or otherwise configured to ensure proper polarity by permitting the utility extension portion 14 to be connected in only one way, thereby preventing electrical damage to the load 30, the wiring harness 10 and/or the electrical system 16 of the host vehicle 18 due to unintentionally reversing the polarity. Also disposed along the length of the conductor 42 is preferably a fuse 48 adequate to prevent damage to the wiring harness 10, the load 30 or to the host vehicle's electrical system 16.

The utility extension portion 14 preferably comprises an insulated two-pair electrical conductor 50, with the one end 24 terminating in a male connector 52 adapted to mate with the receptacle 46 at the second end 22 of the main extension portion 12. The other end 26 of the utility extension portion 14 is preferably adapted to electrically connect to the load 30. As best illustrated in FIG. 10, the utility extension portion 14 is preferably comprised of a first segment 54 and a plurality of interchangeable second segments 56.

The wire gauge of the utility extension portion 14 is preferably appropriately sized in accordance with established electrical standards. For example, for jump starting vehicles, the electrical conductor 50 of the utility extension portion 14 is preferably at least equal to the wire gauge of the conductor 42 of the main extension portion 12. However, for powering low voltage accessories, the electrical conductor 50 of the utility extension portion 14 may comprise a much smaller wire gauge, such as, for example, 12 awg, 14 awg or 18 awg, as appropriate.

Figure 3:
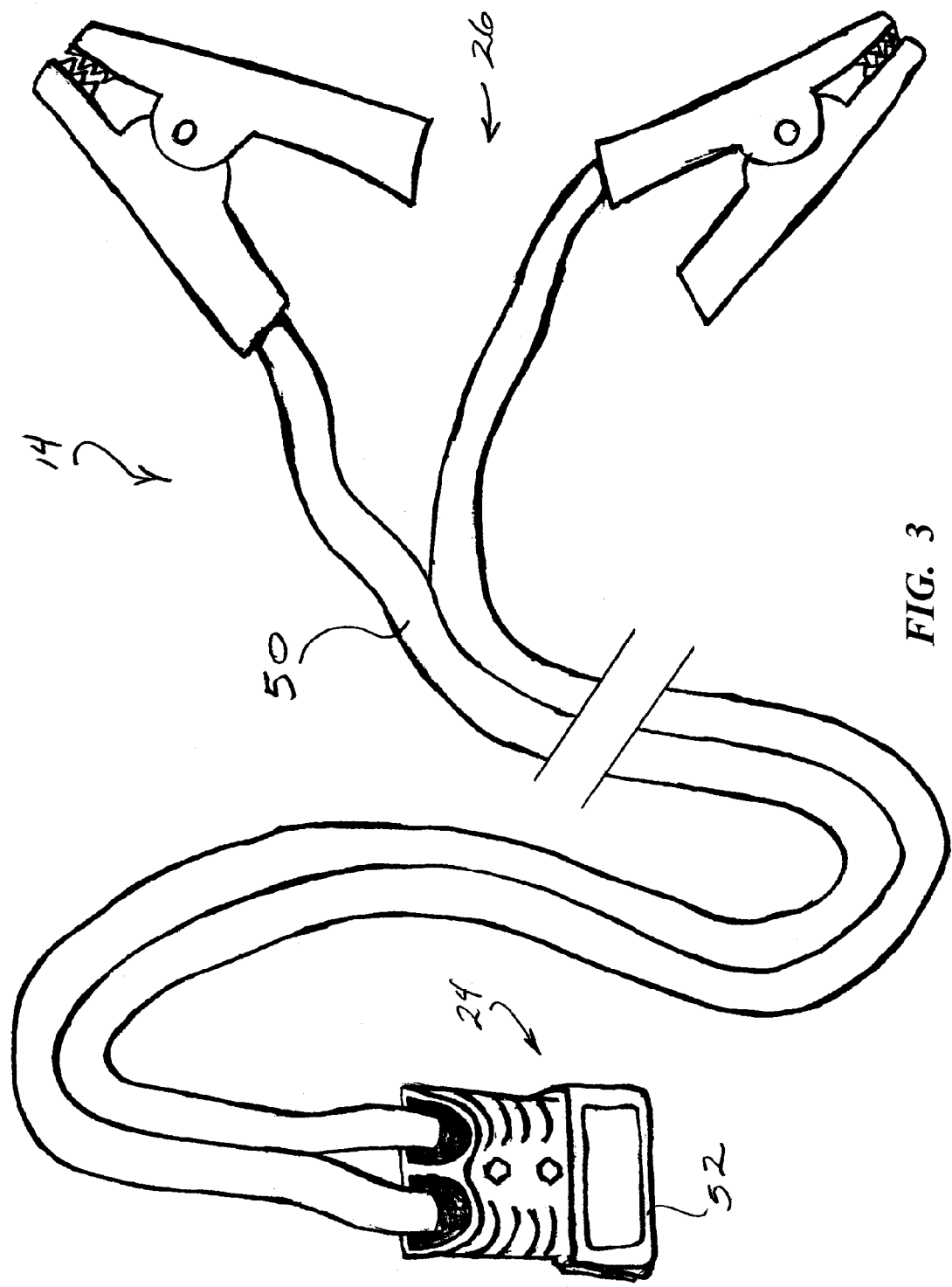
FIG. 3 is a general illustration of an embodiment of one type of utility extension portion of the wiring harness kit of FIG. 1.
Figure 9:
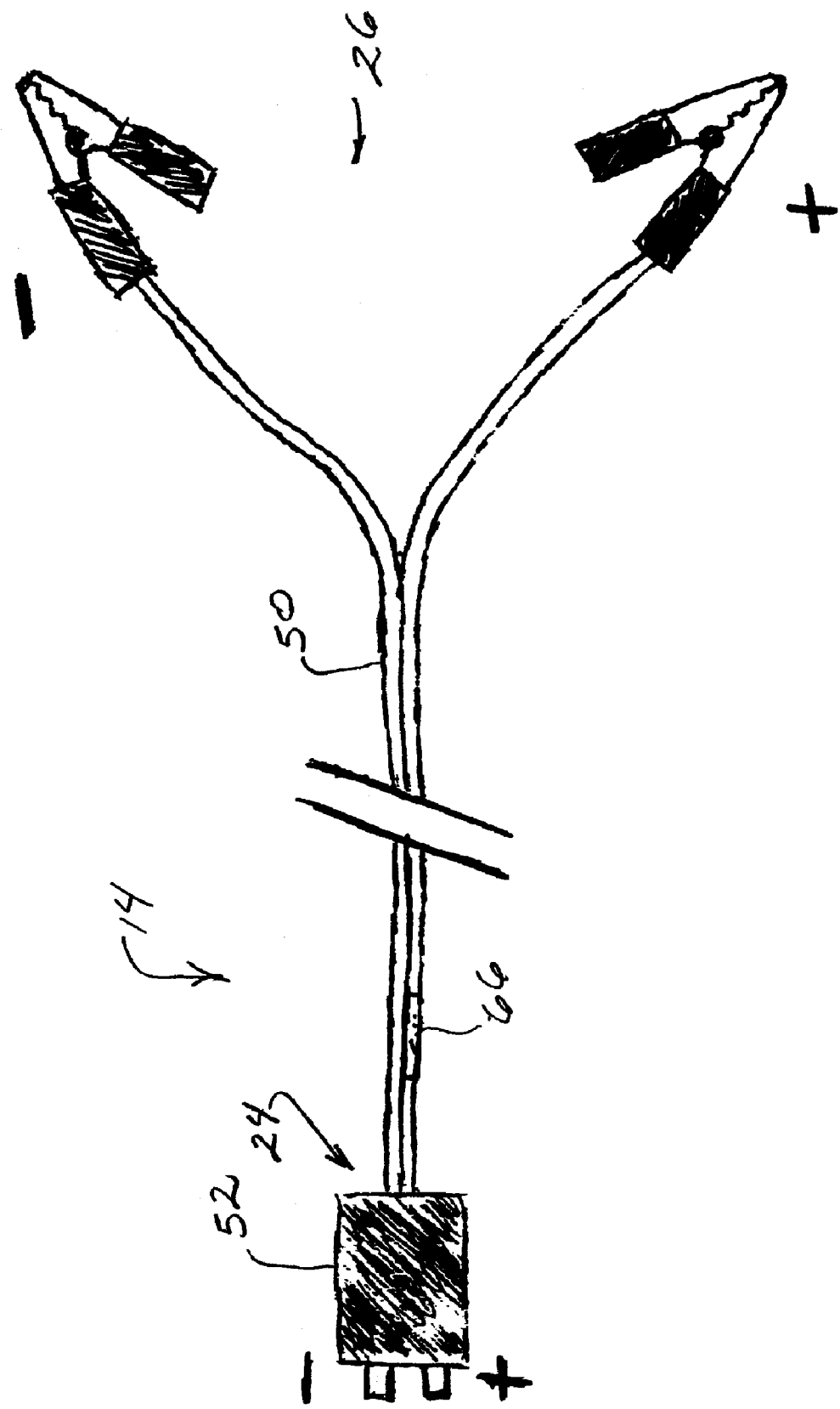
FIG. 9 is a more detailed illustration of the utility extension portion of FIG. 3.
Figure 11:
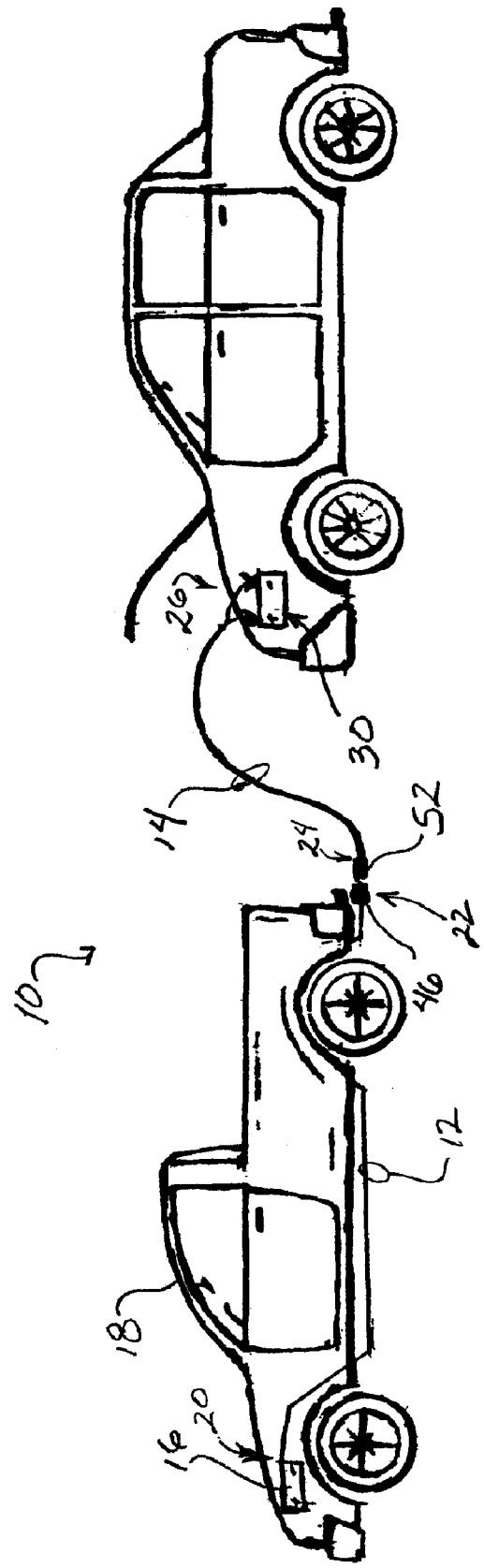
FIG. 11 illustrates a host vehicle having the wiring harness kit of FIG. 9 coupled thereto and being used for jump starting a second vehicle.
Figure 12:
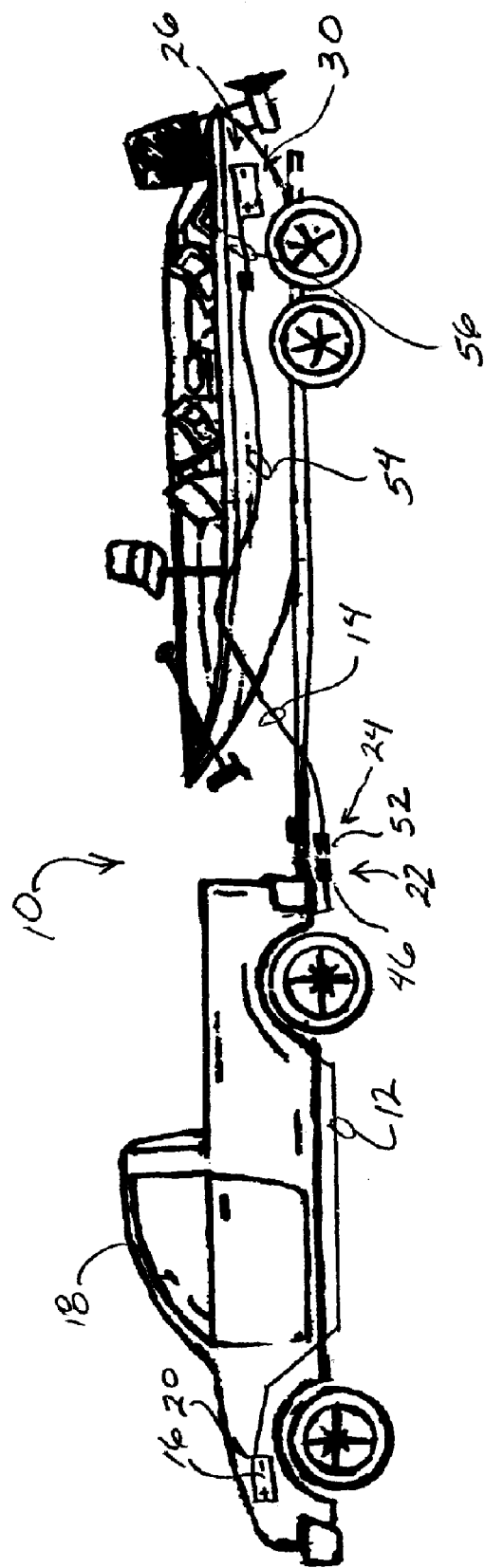
FIG. 12 illustrates a host vehicle having the wiring harness kit of FIG. 10 coupled thereto and being used for charging a battery of a boat while in tow behind the host vehicle.

Referring to FIGS. 3 and 9 in combination with FIG. 11, one embodiment of the utility extension portion 14 is illustrated for use when jump starting vehicles. In this embodiment, the connector 52 at the one end 24 of the utility extension portion 14 is adapted to be matingly received by the female receptacle 46 at the second end 22 of the main extension portion 12. At the other end 26, the utility extension portion 14 includes alligator clips, or the like, for removably connecting to the load 30, for example, to a dead battery of another vehicle.

Figure 7:
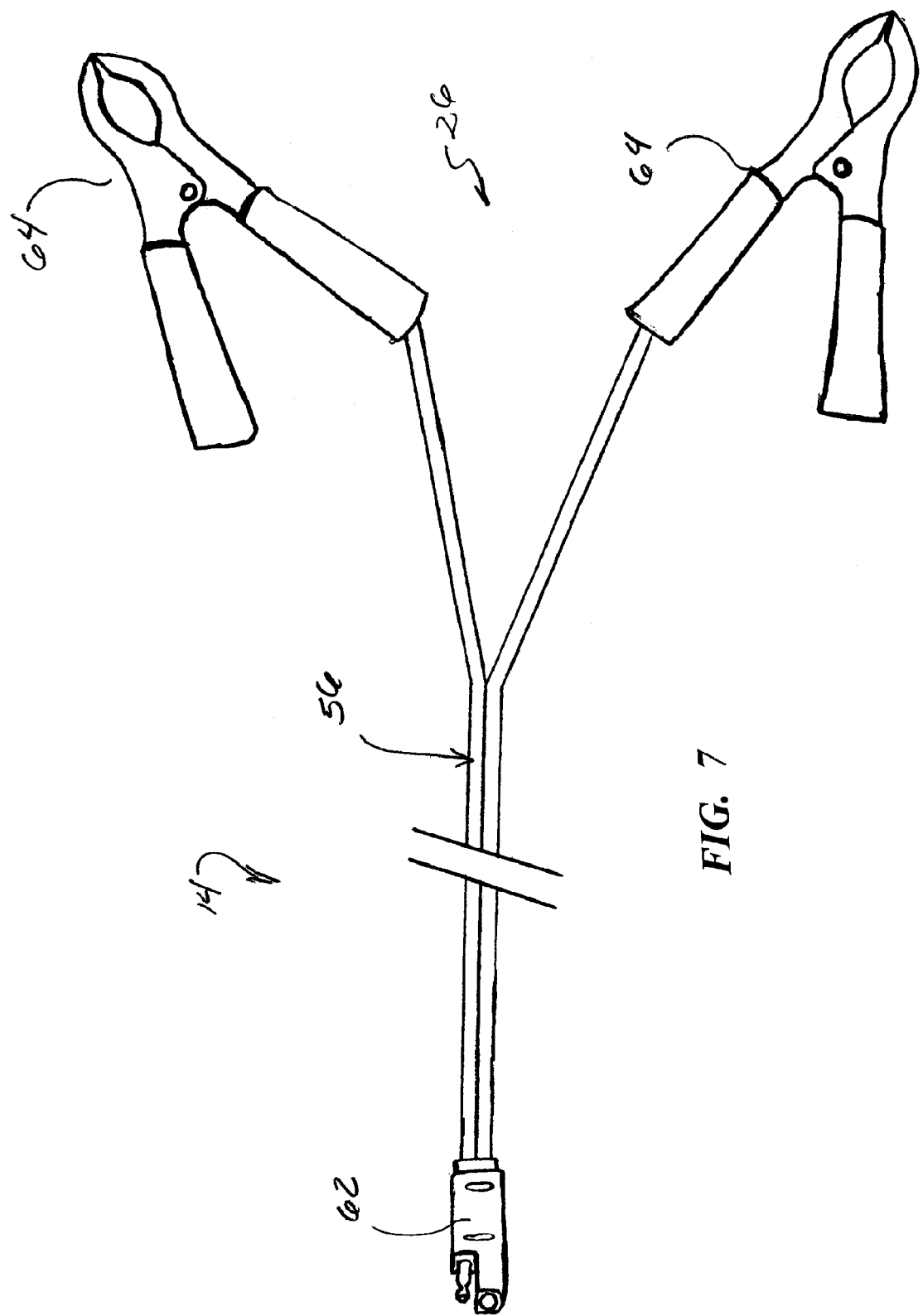
Figure 8:
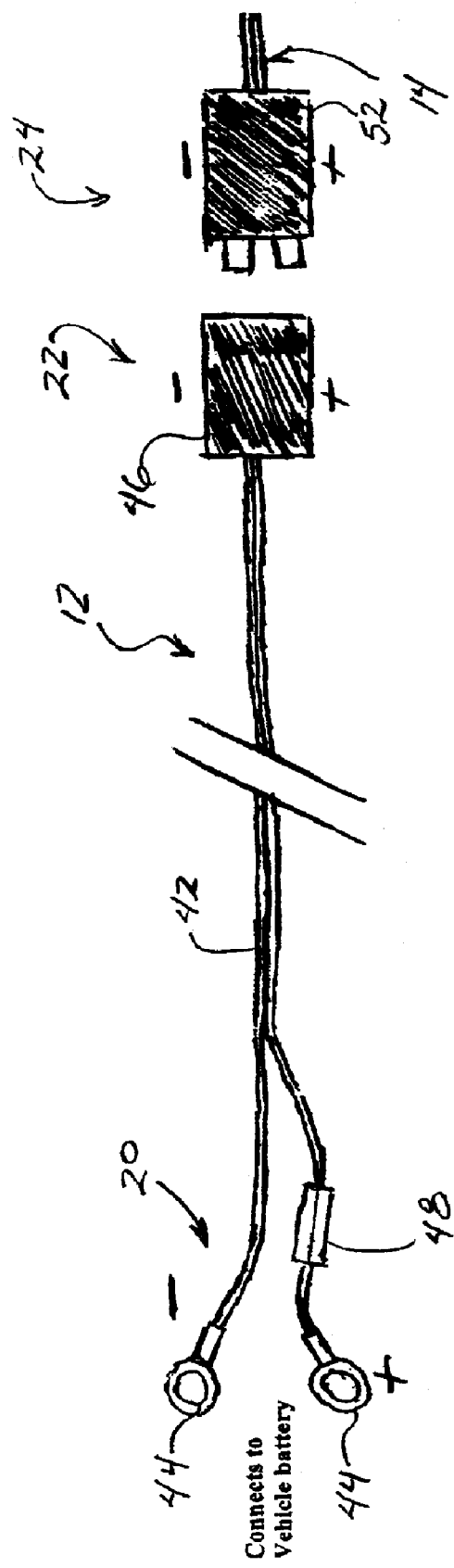
FIG. 8 is a more detailed illustration of the main extension portion of the wiring harness kit of FIG. 2.
Figure 10:
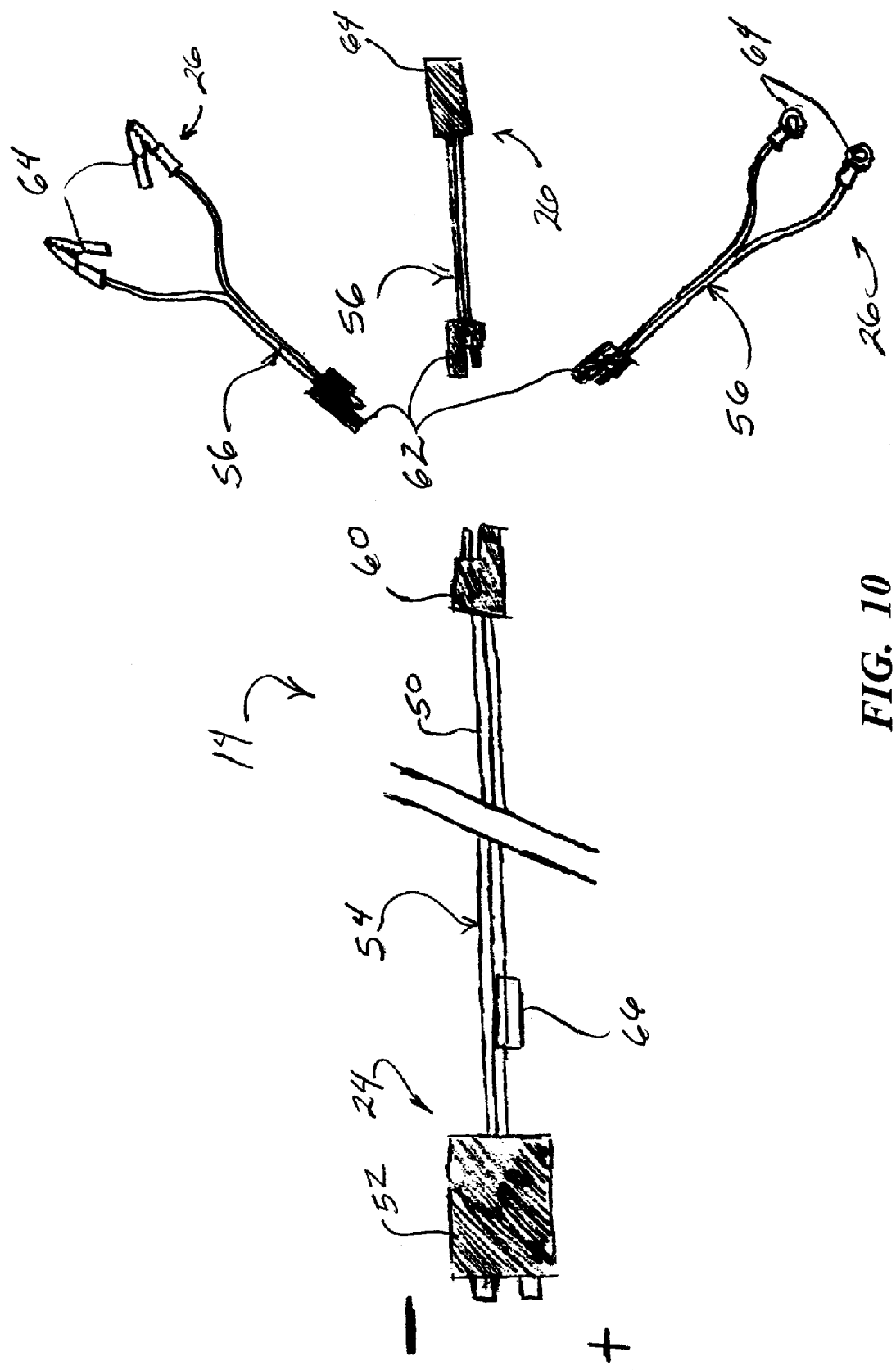
FIG. 10 is another embodiment of the utility extension portion of the wiring harness kit of the present invention of FIG. 1, wherein the utility extension includes a first segment and a plurality of interchangeable second segments having different connectors for connecting to various types of electric loads.
Figure 13:
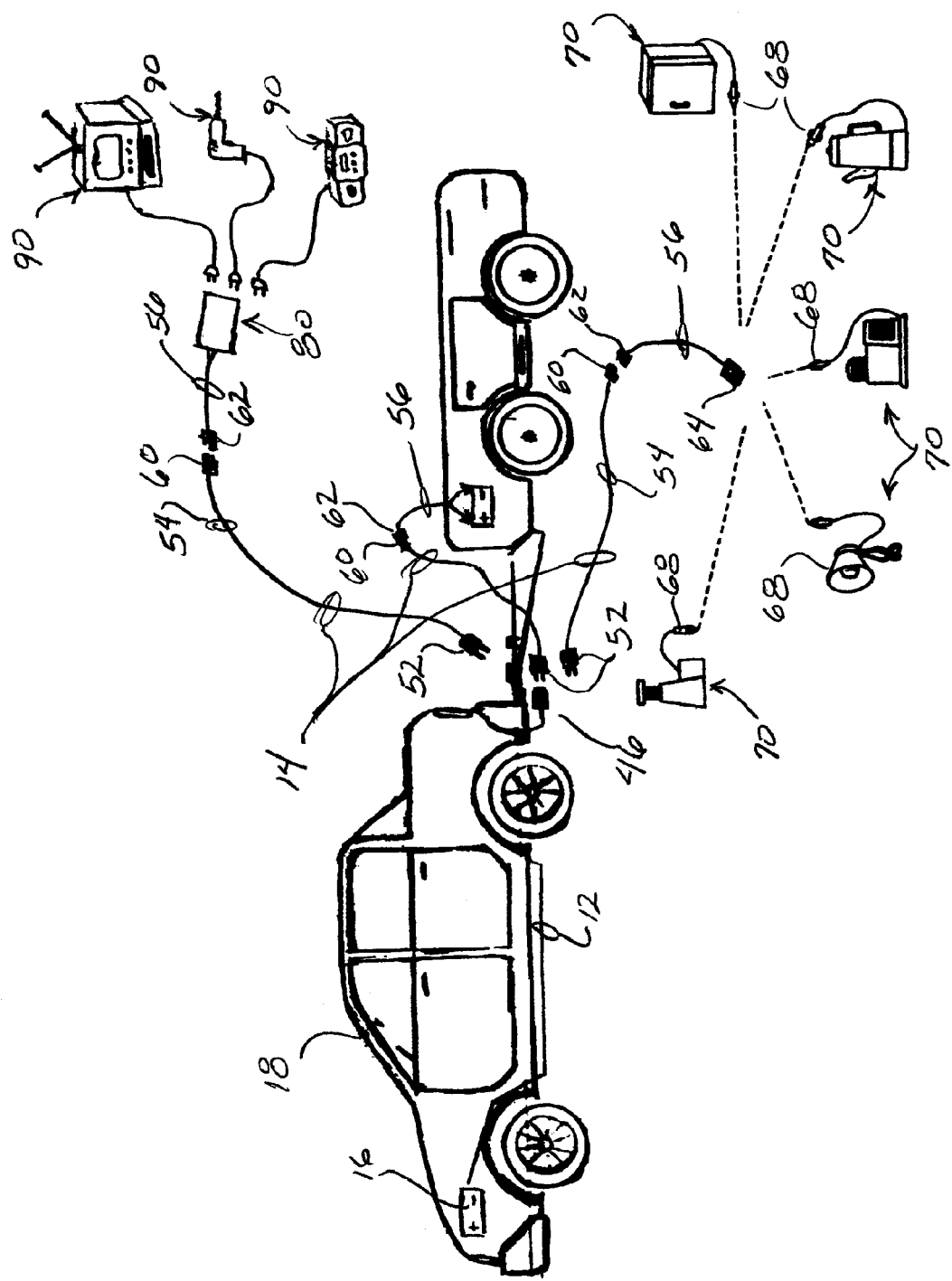
FIG. 13 illustrates a host vehicle having the wiring harness kit of FIG. 10 being used for powering various accessories.

FIGS. 4-7 in combination with FIG. 10 illustrates other embodiments of the utility extension portion 14. As previously identified, the utility extension 14 preferably comprises a first segment 54 and a plurality of interchangeable second segments 56. The first and second segments 54, 56 are preferably joined via mating keyed connectors 60, 62. At the other end 26, each of the interchangeable second segments 56 preferably includes an appropriate load connector 64 adapted to electrically couple with the load 30. A fuse 66 may be provided in either the first or second segments 54, 56. FIG. 7, for example illustrates a load connector 64 comprising alligator clamps for connecting to a boat or camper battery (FIGS. 11, 13) for charging while towing. FIG. 6 illustrates a load connector 64 comprising a ring-type spade connector for a more secure connection, or where alligator clips are not feasible. FIG. 5 in combination with FIG. 13 illustrates that the load connector 64 may comprise a socket similar to a vehicle's cigarette lighter socket for receiving a plug 68 of a portable 12-volt electrical appliance 70 configured to electrically couple therewith, such as, for example, an electric jack, a spot light, a coffee pot, a refrigerator, or a warning light, or for connecting to a power inverter 80, such as for operably powering 120-volt electrical appliances 90, such as a television, power tools or a radio, for example.

Although only exemplary embodiments of the invention have been described above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. In combination, a host vehicle, a plurality of electric loads, and a wiring harness kit, said wiring harness kit comprising:
   a main extension portion comprising an insulated electrical conductor having a wire gauge, said main extension portion having a first end and a second end, said first end for electrically coupling to an electrical system of the host vehicle, said second end disposed remote from said first end; and
   a utility extension portion having one end for electrically coupling to said second end of said main extension portion and another end for electrically coupling to any of the plurality of the electric loads, said utility extension portion comprising a first segment and a plurality of interchangeable second segments, said first segment comprising an insulated electrical conductor having a wire gauge at least substantially equal to said wire gauge of said main extension portion, said interchangeable second segments selected from a group consisting of:
      a jumper extension comprising an insulated electrical conductor having a wire gauge at least substantially equal to said wire gauge of said first segment, said jumper extension having a first end for removably electrically coupling to said first segment said and having a second end for removably electrically coupling to a first one of the plurality of electric loads, wherein said first one of the plurality of electric loads is another vehicle battery electrically coupled to another vehicle and wherein the jumper extension is used for jump starting said another vehicle; and
      a load connector extension, said load connector extension comprising an insulated electrical conductor having a wire gauge less than said wire gauge of said jumper extension portion, said load connector extension having a first end for removably electrically coupling to said first segment and having a second end for removably electrically coupling to a second one of the plurality of loads, wherein the second one of the plurality of loads includes an electrical appliance.

2. The combination of claim 1 wherein said second end of said load connector extension for removably electrically coupling to said second one of the plurality of load, includes a cigarette lighter-type socket.

3. The combination of claim 1 wherein said electrical appliance is selected from a first group of electrical appliances including:
   an electric jack, a spotlight, a coffee pot, a refrigerator, a warning light, and an electrical inverter for operably powering 120-volt AC appliances.

4. The combination of claim 3 wherein said electrical appliance further includes a second group of electrical appliances for electrically coupling to said electrical inverter, said second group of electrical appliances selected from a group including:
   a television, a radio, and hand-held electric power tools.

* * * * *